UNITED STATES PATENT OFFICE.

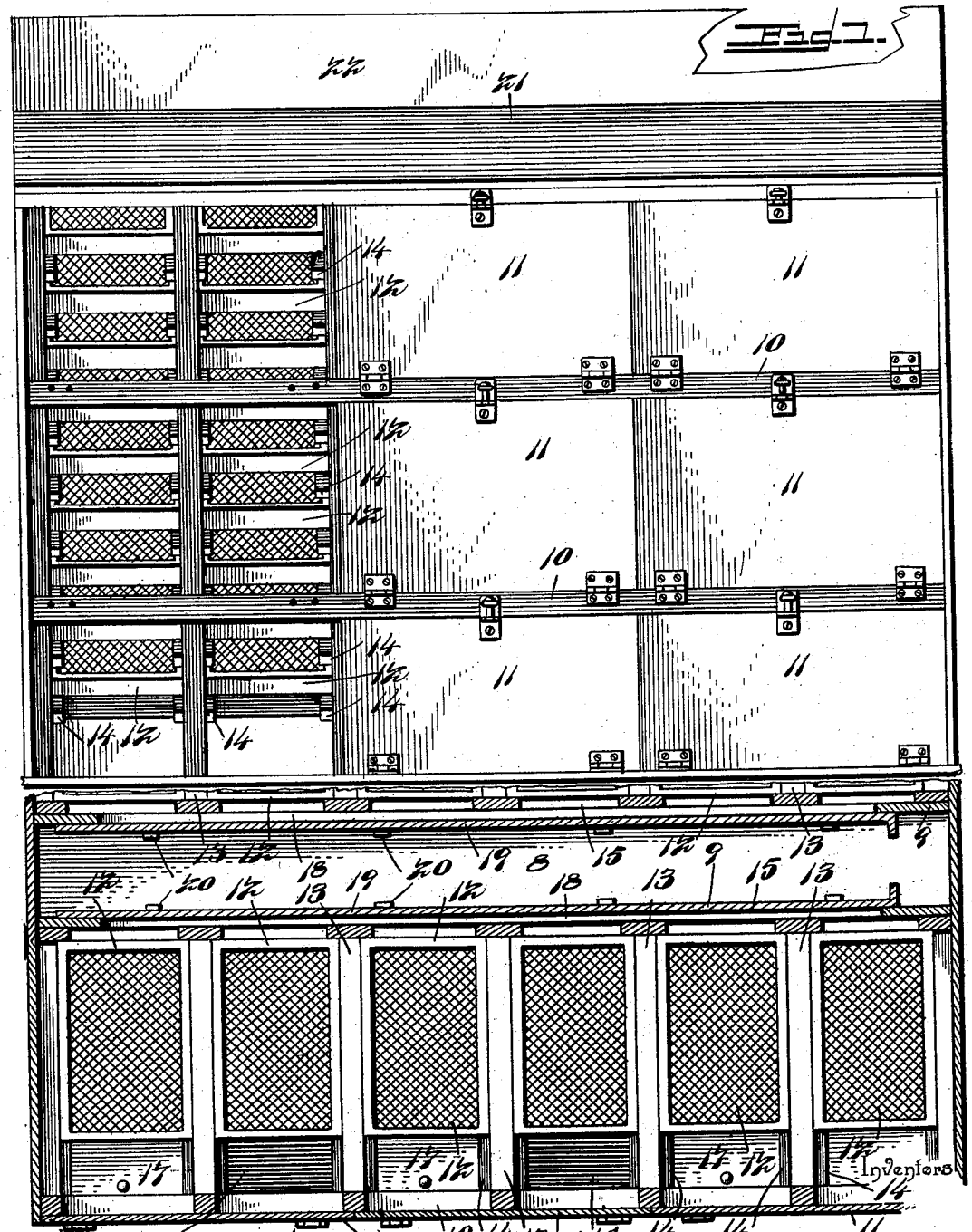

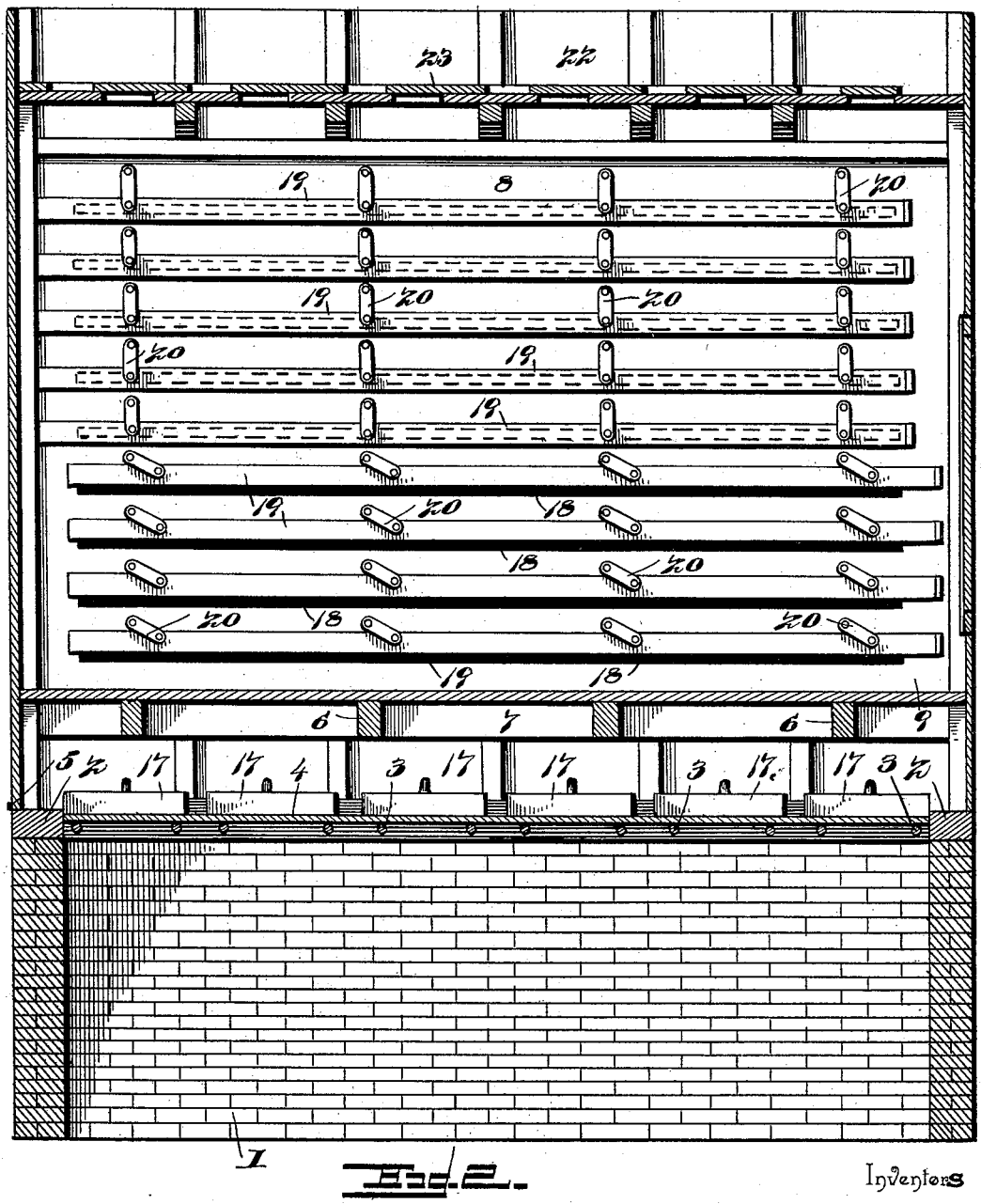

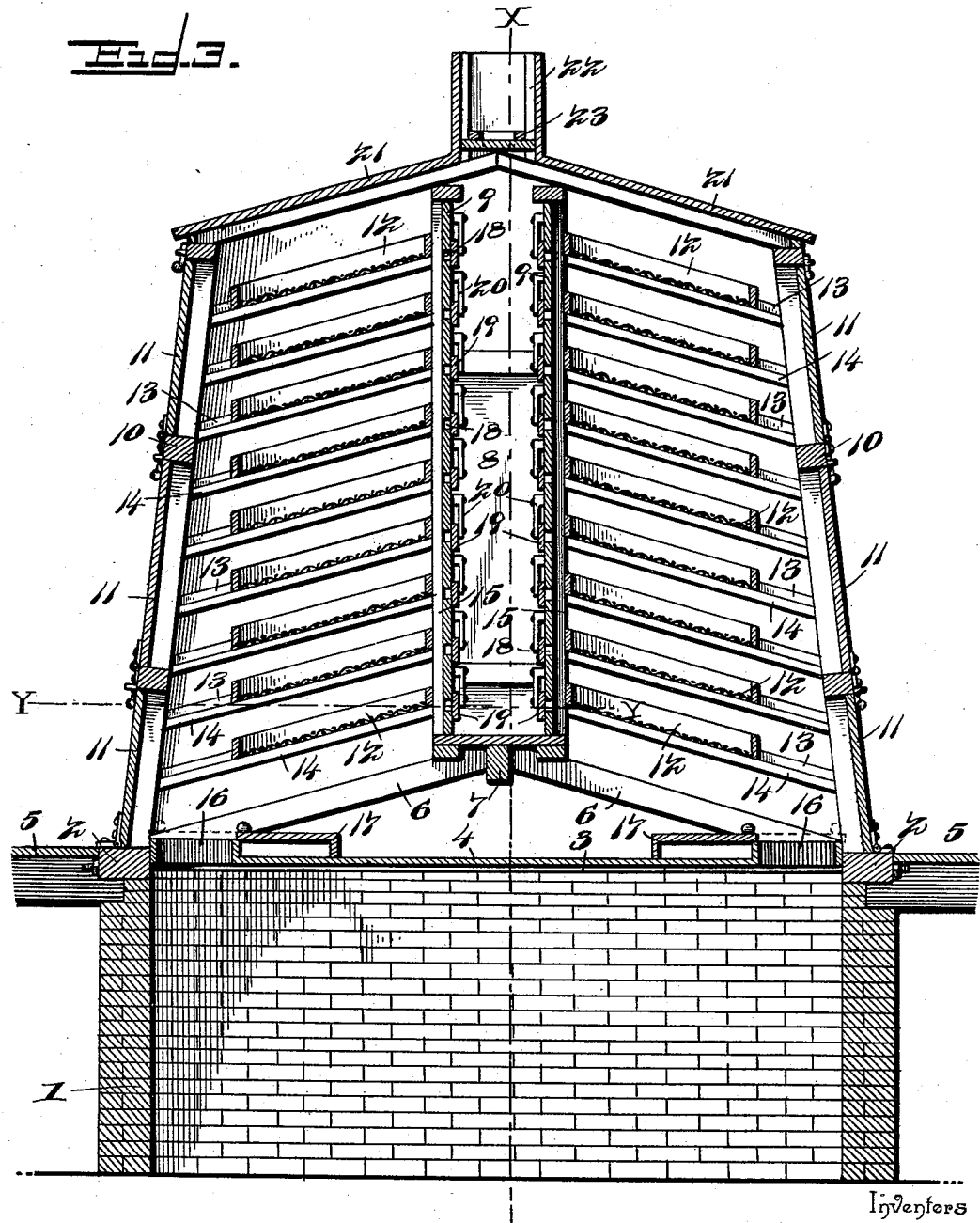

GEORGE A. STEEVENS AND BYRON G. STEEVENS, OF SALEM, OREGON.

FRUIT-DRIER.

SPECIFICATION forming part of Letters Patent No. 599,647, dated February 22, 1898.

Application filed March 17, 1897. Serial No. 627,957. (No model.)

*To all whom it may concern:*

Be it known that we, GEORGE A. STEEVENS and BYRON G. STEEVENS, citizens of the United States, residing at Salem, in the county of Marion and State of Oregon, have invented a new and useful Fruit-Drier, of which the following is a specification.

Various forms of apparatus have been devised for drying fruits, but are not well adapted for curing prunes, and as the present invention aims to provide a means especially adapted for this particular purpose the improvement will be better understood from the following detailed description, reference being had to the accompanying drawings.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a front elevation of a drier constructed in accordance with this invention, having a set of doors removed, exposing two tiers of trays at one end of the apparatus. Fig. 2 is a vertical longitudinal section on the line X X of Fig. 3, looking in the direction of the arrow, showing some of the dampers open and some closed. Fig. 3 is a transverse section. Fig. 4 is a plan section of a portion of the drier on the line Y Y of Fig. 3.

Corresponding and like parts are referred to in the following description and indicated in the several views of the accompanying drawings by the same reference characters.

The drier is erected over a furnace-room or heater 1 upon sills 2, resting upon the walls of the furnace-room or heater and which sills are prevented from spreading by a series of tie-rods 3. A crown-sheet 4, of metal, extends over the furnace-room or heater and is supported upon the tie-rods 3 or in any way found most advantageous and is about on a line with the floor 5. Rafters or beams 6 are supported at their outer ends by means of the sills 2 and have connection at their inner ends with a longitudinal beam or purlin 7 and support the interior part of the structure. An air-shaft 8 is located centrally of the structure and is formed between vertical walls 9, which extend parallel from one end wall to the other. The outer walls 10 incline inwardly toward their upper ends, so as to gradually contract the space formed between them and the front ends of the trays, whereby the hot air or steam is deflected from the vertical and crowded toward the trays, so as to enter among them the more readily when a draft is created by opening dampers in the walls of the air-shaft 8. The walls 10 comprise a framework consisting of longitudinal and upright studs and doors 11, the latter being hinged at their lower edges to the horizontal studs and disposed in vertical series to admit of access being had to the trays 12, which are arranged in tiers upon racks connecting the walls 10 and 9. The racks incline inwardly and upwardly and are formed of bars 13, having their upper portions rabbeted to provide ledges 14, upon which the trays 12 slide into and out of the drier. A relief-space 15 is provided in the rear of the trays for the escape of the drying medium, whereby the fruit at the inner upper portion of the trays is prevented from burning before that at the front end is cured.

The racks are provided in vertical and parallel series and are readily accessible through the openings closed by the doors 11, and by inclining inwardly and upwardly they conform more nearly to the natural draft of an ascending current of air, whereby the fruit is more rapidly cured, as a ready escape is had for the moist air or steam. An opening 16 is formed in the outer portion of the crown-sheet 4 for each tier of trays and is controlled by a damper 17, which when closed cuts off the direct heat to any particular tier of trays and which provides for controlling the heating medium as required. Any suitable means may be provided for operating these dampers; but as they are readily accessible by means of the lower doors it is not deemed necessary in the present drawings to show any particular form, as they may be easily operated by hand. In some instances it may be desirable to have the exterior faces of the upright walls 10 appear vertical; but in such cases, in order to secure the advantages of the invention, the inner faces are caused to incline, whereby the ascending air or steam is deflected from the perpendicular in the manner and for the purpose set forth.

In order to secure a direct circulation of the drying medium through any particular tray of a series, openings 18 are formed in the walls 9 about opposite the trays, and these openings are closed by slats or dampers 19, which have pivotal connection with links 20, which in turn are pivoted at their upper ends to the walls 9. Hence by moving any one of the slats or dampers 19 longitudinally it will receive a simultaneous vertical movement by reason of the links 20 moving from the perpendicular, as most clearly indicated in Fig. 2. By a proper manipulation of the slats or dampers the openings 18 can be uncovered more or less, thereby controlling the circulation and retarding or hastening the drying or curing process, as desired. These dampers are light and the friction between them and the walls 9 and the links 20 and between the links and their pivotal connection with the said slats and walls is sufficient to hold the dampers in an adjusted position under ordinary conditions; but if positive means are desired any catch mechanism generally employed in the mechanic arts for securing relatively-movable parts, such as a notched rod and stop, may be employed.

The roof 21 is peaked and has a ventilating-shaft 22 at the crest directly above the air-shaft 8, and this ventilating-shaft is provided with a damper 23 for controlling the final escape of the heating medium laden with the moisture taken up from the fruit in the drying operation. In the event of fire and when desired for any purpose the damper 23 may be operated to entirely shut off any draft through the ventilating-shaft, whereby all circulation through the drier is entirely suspended. The length and height of the apparatus may be varied and will depend upon the capacity of the drier; but the structural features herein referred to will be observed in constructing a drier of any capacity within the sense and spirit of the invention.

Having thus described the invention, what is claimed as new is—

1. In a fruit-drier, a vertical series of trays having a space in front communicating with the spaces formed between the trays and common to the series, a vertical wall separating the rear ends of the trays from an air-shaft and having openings opposite the spaces formed between the trays, means for admitting hot air or a drying medium into the space in front of the trays, and individual dampers capable of independent operation for controlling the openings in the said vertical wall, whereby the drying medium is caused to circulate more or less over and through the trays, substantially as described.

2. In a fruit-drier, the combination of a series of trays arranged above one another with their front ends in vertical alinement, means for admitting a drying medium into the space formed in front of the trays, a wall inclining inwardly at its upper end, whereby the said space in front of the trays is contracted at its upper end and the drying medium deflected uniformly toward the trays, and damper-controlled openings or exits in the rear of the individual trays, substantially as set forth for the purpose described.

3. In a fruit-drier, the combination of a series of trays arranged above one another with their front ends in vertical alinement, and having an air-shaft in their rear and a vertical space in front, the outer wall forming the said vertical space inclining inwardly at its upper end to contract the space and uniformly deflect the drying medium toward the trays, means for admitting a heating medium into the said vertical space, and individually-operated dampers for controlling openings in the wall of the air-shaft separating the latter from the trays, and opposite the spaces formed between the trays, substantially as and for the purpose set forth.

4. In a fruit-drier, the combination of a vertical series of trays having a vertical space in front thereof contracted at its upper end and an air-shaft in their rear, a damper-controlled opening for admitting a drying medium into the lower end of the vertical space, independently-operated dampers for controlling openings in the wall of the air-shaft separating the latter from the trays, a ventilating-shaft in line with the air-shaft and a damper between the air and ventilating shafts, substantially as set forth.

5. In a fruit-drier, the combination of a vertical air-shaft, a vertical series of trays on each side of the air-shaft and having vertical spaces in their front, means for admitting a drying medium into the lower portion of each vertical space, damper-controlled openings in the walls of the air-shaft opposite the spaces formed between the trays, a ventilating-shaft, and a damper between the ventilating and air shafts, substantially as specified.

6. A fruit-drier comprising a furnace-room or heater, wooden sills placed upon opposite walls of the furnace-room, a purlin parallel with the sills, beams connecting the purlin with the sills, a superstructure mounted upon the sills and purlin and comprising upwardly-converging walls, a central air-space, trays disposed in vertical series upon each side of the air-space, a damper-controlled opening in the walls of the air-space opposite the space between the trays, tie-rods connecting the aforesaid sills, a sheet-metal crown supported upon the tie-rods and separating the furnace-room from the superstructure, and dampers controlling openings in the outer edges of the metallic crown opposite the air-spaces between the fronts of the trays and the converging walls, substantially as specified.

In testimony that we claim the foregoing as our own we have hereto affixed our signatures in the presence of two witnesses.

GEORGE A. STEEVENS.
BYRON G. STEEVENS.

Witnesses:
PAUL KLINGELE,
JULIUS NELSON.